US007673182B2

(12) United States Patent
Gooding et al.

(10) Patent No.: US 7,673,182 B2
(45) Date of Patent: Mar. 2, 2010

(54) METHOD AND APPARATUS FOR OBTAINING STACK TRACEBACK DATA FOR MULTIPLE COMPUTING NODES OF A MASSIVELY PARALLEL COMPUTER SYSTEM

(75) Inventors: Thomas Michael Gooding, Rochester, MN (US); Patrick Joseph McCarthy, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 656 days.

(21) Appl. No.: 11/425,778

(22) Filed: Jun. 22, 2006

(65) Prior Publication Data

US 2008/0126767 A1 May 29, 2008

(51) Int. Cl.
*G06F 11/00* (2006.01)
(52) U.S. Cl. .................................................. 714/39
(58) Field of Classification Search .................. 714/39
See application file for complete search history.

(56) References Cited

U.S. PATENT DOCUMENTS

| | | | | |
|---|---|---|---|---|
| 5,748,872 A | * | 5/1998 | Norman | 714/11 |
| 5,819,094 A | * | 10/1998 | Sato et al. | 717/131 |
| 6,057,839 A | * | 5/2000 | Advani et al. | 715/784 |
| 6,735,758 B1 | * | 5/2004 | Berry et al. | 717/130 |
| 7,562,258 B2 | * | 7/2009 | Williams et al. | 714/45 |
| 2002/0144019 A1 | * | 10/2002 | Gooding | 709/330 |
| 2003/0061550 A1 | * | 3/2003 | Ng et al. | 714/45 |
| 2003/0217087 A1 | * | 11/2003 | Chase et al. | 709/1 |
| 2005/0081112 A1 | * | 4/2005 | Aguilar et al. | 714/39 |

* cited by examiner

*Primary Examiner*—Scott T Baderman
*Assistant Examiner*—Yair Leibovich
(74) *Attorney, Agent, or Firm*—Roy W. Truelson

(57) ABSTRACT

A data collector for a massively parallel computer system obtains call-return stack traceback data for multiple nodes by retrieving partial call-return stack traceback data from each node, grouping the nodes in subsets according to the partial traceback data, and obtaining further call-return stack traceback data from a representative node or nodes of each subset. Preferably, the partial data is a respective instruction address from each node, nodes having identical instruction address being grouped together in the same subset. Preferably, a single node of each subset is chosen and full stack traceback data is retrieved from the call-return stack within the chosen node.

19 Claims, 6 Drawing Sheets

METHOD AND APPARATUS FOR OBTAINING STACK TRACEBACK DATA FOR MULTIPLE COMPUTING NODES OF A MASSIVELY PARALLEL COMPUTER SYSTEM

STATEMENT REGARDING FEDERALLY SPONSORED RESEARCH OR DEVELOPMENT

This invention was made with Government support under Contract No. B591700 awarded by the Department of Energy. The Government has certain rights in this invention.

FIELD OF THE INVENTION

The present invention relates to digital data processing, and in particular to the operation of massively parallel computer systems comprising multiple nodes arranged in a regular matrix.

BACKGROUND OF THE INVENTION

In the latter half of the twentieth century, there began a phenomenon known as the information revolution. While the information revolution is a historical development broader in scope than any one event or machine, no single device has come to represent the information revolution more than the digital electronic computer. The development of computer systems has surely been a revolution. Each year, computer systems grow faster, store more data, and provide more applications to their users.

A modern computer system typically comprises one or more central processing units (CPU) and supporting hardware necessary to store, retrieve and transfer information, such as communication buses and memory. It also includes hardware necessary to communicate with the outside world, such as input/output controllers or storage controllers, and devices attached thereto such as keyboards, monitors, tape drives, disk drives, communication lines coupled to a network, etc. The CPU or CPUs are the heart of the system. They execute the instructions which comprise a computer program and directs the operation of the other system components.

From the standpoint of the computer's hardware, most systems operate in fundamentally the same manner. Processors are capable of performing a limited set of very simple operations, such as arithmetic, logical comparisons, and movement of data from one location to another. But each operation is performed very quickly. Sophisticated software at multiple levels directs a computer to perform massive numbers of these simple operations, enabling the computer to perform complex tasks. What is perceived by the user as a new or improved capability of a computer system is made possible by performing essentially the same set of very simple operations, but doing it much faster, and thereby enabling the use of software having enhanced function. Therefore continuing improvements to computer systems require that these systems be made ever faster.

The overall speed of a computer system (also called the throughput) may be crudely measured as the number of operations performed per unit of time. Conceptually, the simplest of all possible improvements to system speed is to increase the clock speeds of the various components, and particularly the clock speed of the processor(s). E.g., if everything runs twice as fast but otherwise works in exactly the same manner, the system will perform a given task in half the time. Enormous improvements in clock speed have been made possible by reduction in component size and integrated circuitry, to the point where an entire processor, and in some cases multiple processors along with auxiliary structures such as cache memories, can be implemented on a single integrated circuit chip. Despite these improvements in speed, the demand for ever faster computer systems has continued, a demand which can not be met solely by further reduction in component size and consequent increases in clock speed. Attention has therefore been directed to other approaches for further improvements in throughput of the computer system.

Without changing the clock speed, it is possible to improve system throughput by using multiple processors. The modest cost of individual processors packaged on integrated circuit chips has made this approach practical. Although the use of multiple processors creates additional complexity by introducing numerous architectural issues involving data coherency, conflicts for scarce resources, and so forth, it does provide the extra processing power needed to increase system throughput.

Various types of multi-processor systems exist, but one such type of system is a massively parallel nodal system for computationally intensive applications. Such a system typically contains a large number of processing nodes, each node having its own processor or processors and local (nodal) memory, where the nodes are arranged in a regular matrix or lattice structure. The system contains a mechanism for communicating data among different nodes, a control mechanism for controlling the operation of the nodes, and an I/O mechanism for loading data into the nodes from one or more I/O devices and receiving output from the nodes to the I/O device (s). In general, each node acts as an independent computer system in that the addressable memory used by the processor is contained entirely within the processor's local node, and the processor has no capability to directly reference data addresses in other nodes. However, the control mechanism and I/O mechanism are shared by all the nodes.

A massively parallel nodal system such as described above is a general-purpose computer system in the sense that it is capable of executing general-purpose applications, but it is designed for optimum efficiency when executing computationally intensive applications, i.e., applications in which the proportion of computational processing relative to I/O processing is high. In such an application environment, each processing node can independently perform its own computationally intensive processing with minimal interference from the other nodes. In order to support computationally intensive processing applications which are processed by multiple nodes in cooperation, some form of inter-nodal data communication matrix is provided. This data communication matrix supports selective data communication paths in a manner likely to be useful for processing large processing applications in parallel, without providing a direct connection between any two arbitrary nodes. Optimally, I/O workload is relatively small, because the limited I/O resources would otherwise become a bottleneck to performance.

An exemplary massively parallel nodal system is the IBM Blue Gene™ system. The IBM Blue Gene system contains many processing nodes, each having multiple processors and a common local (nodal) memory. The processing nodes are arranged in a logical three-dimensional torus network having point-to-point data communication links between each node and its immediate neighbors in the network. Additionally, each node can be configured to operate either as a single node or multiple virtual nodes (one for each processor within the node), thus providing a fourth dimension of the logical network. A large processing application typically creates one ore more blocks of nodes, herein referred to as communicator sets, for performing specific sub-tasks during execution. The application may have an arbitrary number of such communicator sets, which may be created or dissolved at multiple points during application execution. The nodes of a communicator set typically comprise a rectangular parallelepiped of the three-dimensional torus network.

Identifying and determining the cause of errors in a massively parallel computer system, either as a result of hardware faults or software bugs, is often challenging. Applications designed for massively parallel systems are often complex, and intended to be executed by many processors working and cooperating in parallel. If any of the nodes causes an error, the results produced may be erroneous. An error originally occurring in one processing node may be propagated to other nodes, subject to further data processing, and it may be some time downstream before the error is detected. The sheer number of nodes in a communicator set assigned to a particular application, which may be in the thousands, can make error identification enormously difficult.

Often, one step in analyzing errors occurring in a massively parallel system is the collection of call-return stack traceback data for various nodes. Since each node maintains independent state, collection of call-return traceback data means that each node must be accessed and the appropriate data retrieved. Often, stack traceback data is retrieved from the nodes via a special communications path, such as a service or control bus, which is likely to remain operational even if normal data paths become unreliable. Such special communications paths, though more robust, typically operate at significantly slower data rates than the normal data paths used during program execution. Where the number of nodes is extremely large, as in a massively parallel system, the time required to access and retrieve call-return stack traceback data from many nodes can be substantial. A need exists for improved tools or methods for obtaining call-return stack traceback data for a set of nodes in a massively parallel system.

SUMMARY OF THE INVENTION

A data collector for a massively parallel computer system obtains call-return stack traceback data from fewer than all nodes of a pre-defined set of nodes from which stack tracebacks are to be obtained. Preferably, the data collector first retrieves partial call-return stack traceback data from each node of the set, and group the nodes in subsets according to the partial traceback data thus retrieved. The data collector then obtains further call-return stack traceback data with respect to one or more subsets by retrieving data from fewer than all the nodes of each subset, without retrieving such data for other nodes of the subset. With respect to all other nodes of a subset, it is assumed that the call-return stack traceback is the same as that of the node in the subset for which more complete traceback data was actually retrieved. This information is used as input for further analysis or presented to a user as a call-return stack traceback profile for the set of nodes.

In the preferred embodiment, the partial data is a respective current instruction state obtained from a respective instruction state register in each of the nodes. The nodes are grouped in subsets according to the instruction state, i.e., nodes having identical instruction state as indicated by the instruction state register are grouped together in the same subset. It would alternatively be possible to retrieve other or additional data for grouping nodes in subsets. It is assumed that nodes having the same instruction state will have the same stack traceback. With respect to each subset, a single node is arbitrarily chosen and more complete call-return stack traceback data is retrieved from the call-return stack within the chosen node. It would alternatively be possible to choose more than a single node for retrieval of more complete traceback data in order to provide a higher degree of confidence that all nodes have the same stack traceback.

In the preferred embodiment, the more complete call-return stack traceback data retrieved from the chosen node of each subset is the full traceback from the stack, i.e., a record of all calls recorded in the stack. Alternatively, it would be possible to retrieve some number of the most recent calls recorded in the call-return stack.

By retrieving full traceback data from only one node in each subset in accordance with the preferred embodiment of the present invention, the number of nodes from which complete data must be retrieved may in some cases be drastically reduced. Although this technique is not guaranteed to simplify the data collection task in all cases, it involves very little overhead to implement and thus, even in those instances where no significant performance improvement can be obtained, there is no substantial reduction in performance either.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
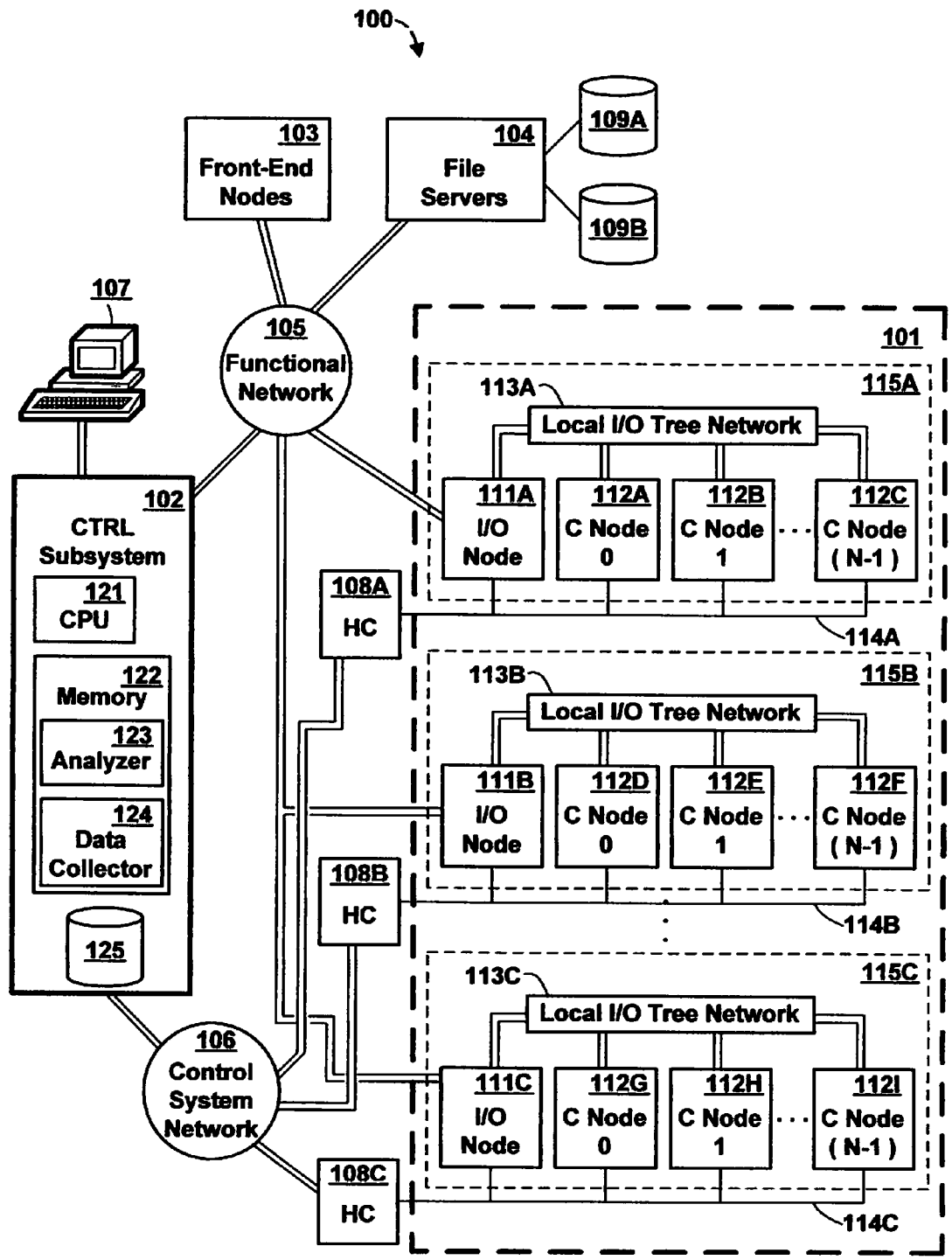
FIG. 1 is a high-level block diagram of the major components of a massively parallel computer system, in accordance with the preferred embodiment of the present invention.

Referring to the Drawing, wherein like numbers denote like parts throughout the several views, FIG. 1 is a high-level block diagram of the major hardware components of a massively parallel computer system 100 in accordance with the preferred embodiment of the present invention. In the preferred embodiment, computer system 100 is an IBM Blue Gene™ computer system, it being understood that other computer systems could be used, and the description of a preferred embodiment herein is not intended to limit the present invention to the particular architecture described. Additional background information concerning the architecture of an IBM Blue Gene™ computer system can be found in commonly assigned copending U.S. patent application Ser. No. 11/316,247 by Bryant et al., entitled "Method and Apparatus for Improving Block Allocation Times in a Computer System", which is herein incorporated by reference.

Computer system 100 comprises a compute core 101 having a large number of compute nodes arranged in a regular array or matrix, which collectively perform the bulk of the useful work performed by system 100. The operation of computer system 100 including compute core 101 is generally controlled by control subsystem 102. Various additional processors contained in front-end nodes 103 perform certain auxiliary data processing functions, and file servers 104 provide an interface to data storage devices such as rotating magnetic disk drives 109A, 109B or other I/O (not shown). Functional network 105 provides the primary data communications path among the compute core 101 and other system components. For example, data stored in storage devices attached to file servers 104 is loaded and stored to other system components through functional network 105.

Compute core 101 comprises I/O nodes 111A-C (herein generically referred to as feature 111) and compute nodes 112A-I (herein generically referred to as feature 112). Compute nodes 112 are the workhorse of the massively parallel system 100, and are intended for executing compute-intensive applications which may require a large number of processes proceeding in parallel. I/O nodes 111 handle I/O operations on behalf of the compute nodes. Each I/O node contains an I/O processor and I/O interface hardware for handling I/O operations for a respective set of N compute nodes 112, the I/O node and its respective set of N compute nodes being referred to as a Pset. Compute core 101 contains M Psets 115A-C (herein generically referred to as feature 115), each containing a single I/O node 111 and N compute nodes 112, for a total of M×N compute nodes 112. The product M×N can be very large. For example, in one implementation M=1024 (1K) and N=64, for a total of 64K compute nodes.

In general, application programming code and other data input required by the compute core for executing user application processes, as well as data output produced by the compute core as a result of executing user application processes, is communicated externally of the compute core over functional network 105. The compute nodes within a Pset 115 communicate with the corresponding I/O node over a corresponding local I/O tree network 113A-C (herein generically referred to as feature 113). The I/O nodes in turn are attached to functional network 105, over which they communicate with I/O devices attached to file servers 104, or with other system components. Thus, the local I/O tree networks 113 may be viewed logically as extensions of functional network 105, and like functional network 105 are used for data I/O, although they are physically separated from functional network 105.

Control subsystem 102 directs the operation of the compute nodes 112 in compute core 101. Control subsystem 102 is preferably a mini-computer system including its own processor or processors 121 (of which one is shown in FIG. 1), internal memory 122, and local storage 125, and having an attached console 107 for interfacing with a system administrator or similar person. Control subsystem 102 includes an internal database which maintains certain state information for the compute nodes in core 101, and a control application executing on the control subsystem's processor(s) which controls the allocation of hardware in compute core 101, directs the pre-loading of data to the compute nodes, and performs certain diagnostic and maintenance functions. Control subsystem preferably includes an analytical program 123 for analyzing errors and a data collection utility 124 for collecting state data from the compute core 101, which execute on processor 121. Analytical program 123 may contain any of various functions for analyzing performance, error or other monitoring data with respect to the operation of system 100, and presenting such data to a user. Data collection utility 124 collects monitoring data, and in particular where necessary collects call-return stack traceback data, as described in greater detail herein. Control system communicates control and state information with the nodes of compute core 101 over control system network 106. Network 106 is coupled to a set of hardware controllers 108A-C (herein generically referred to as feature 108). Each hardware controller communicates with the nodes of a respective Pset 115 over a corresponding local hardware control network 114A-C (herein generically referred to as feature 114). The hardware controllers 108 and local hardware control networks 114 may be considered logically as extensions of control system network 106, although they are physically separate. The control system network and local hardware control network operates at a lower data rate than the functional network 105.

In addition to control subsystem 102, front-end nodes 103 comprise a collection of processors and memory which perform certain auxiliary functions which, for reasons of efficiency or otherwise, are best performed outside the compute core. Functions which involve substantial I/O operations are generally performed in the front-end nodes. For example, interactive data input, application code editing, or other user interface functions are generally handled by front-end nodes 103, as is application code compilation. Front-end nodes 103 are coupled to functional network 105 for communication with file servers 104, and may include or be coupled to interactive workstations (not shown).

Figure 2:
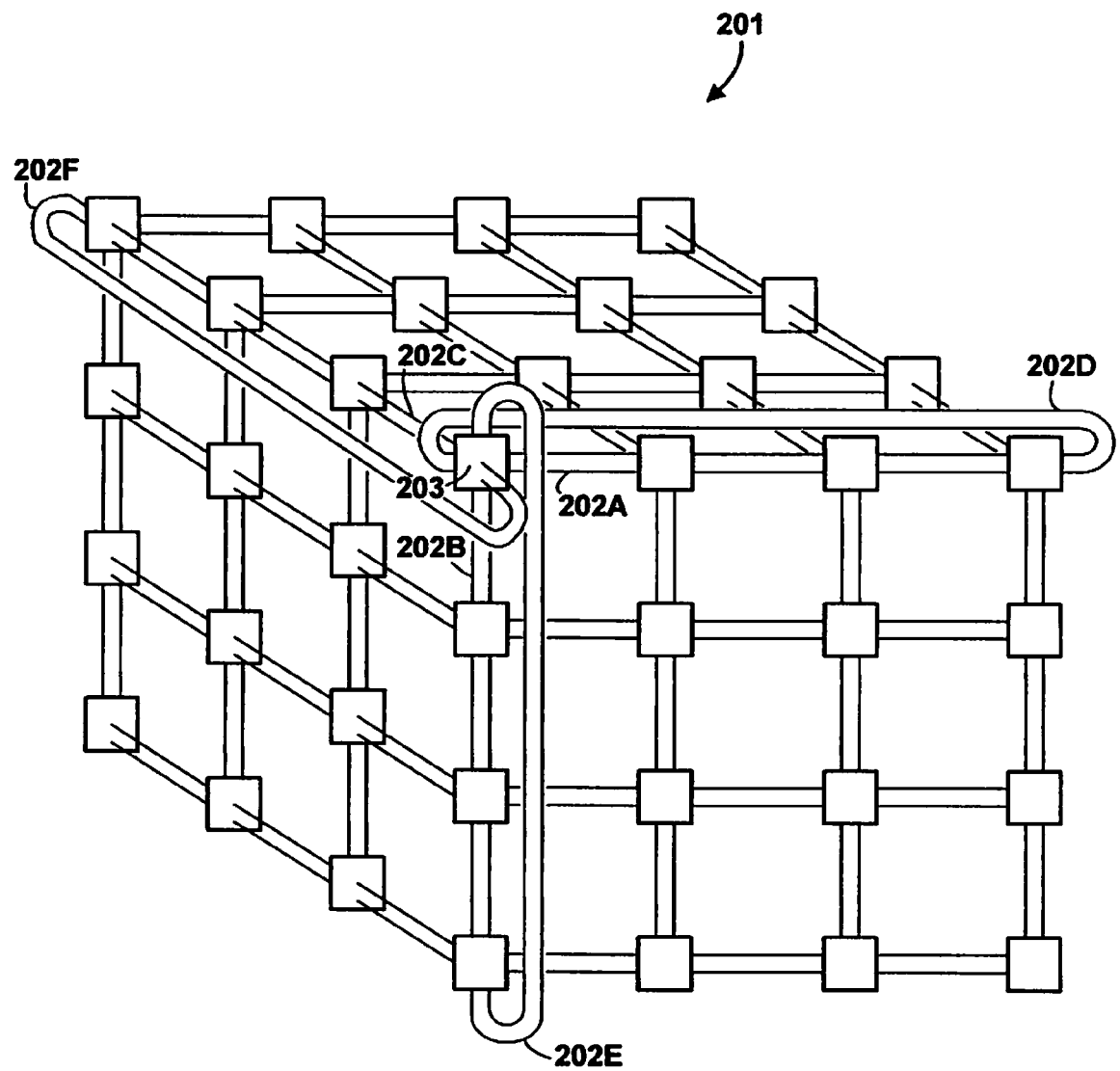
FIG. 2 is a simplified representation of a three dimensional lattice structure and inter-nodal communication network of the system of FIG. 1, according to the preferred embodiment.

Compute nodes 112 are logically arranged in a three dimensional lattice, each compute node having a respective x, y and z coordinate. FIG. 2 is a simplified representation of the three dimensional lattice structure 201. Referring to FIG. 2, a simplified 4×4×4 lattice is shown, in which the interior nodes of the lattice are omitted for clarity of illustration. Although a 4×4×4 lattice (having 64 nodes) is represented in the simplified illustration of FIG. 2, it will be understood that the actual number of compute nodes in the lattice is typically much larger. Each compute node in lattice 201 contains a set of six node-to-node communication links 202A-F (herein referred to generically as feature 202) for communicating data with its six immediate neighbors in the x, y and z coordinate dimensions.

As used herein, the term "lattice" includes any regular pattern of nodes and inter-nodal data communications paths in more than one dimension, such that each node has a respective defined set of neighbors, and such that, for any given node, it is possible to algorithmically determine the set of neighbors of the given node from the known lattice structure and the location of the given node in the lattice. A "neighbor" of a given node is any node which is linked to the given node by a direct inter-nodal data communications path, i.e. a path which does not have to traverse another node. A "lattice" may be three-dimensional, as shown in FIG. 2, or may have more or fewer dimensions. The lattice structure is a logical one, based on inter-nodal communications paths. Obviously, in the physical world, it is impossible to create physical structures having more than three dimensions, but inter-nodal communications paths can be created in an arbitrary number of dimensions. It is not necessarily true that a given node's neighbors are physically the closest nodes to the given node, although it is generally desirable to arrange the nodes in such a manner, insofar as possible, as to provide physical proximity of neighbors.

In the preferred embodiment, the node lattice logically wraps to form a torus in all three coordinate directions, and thus has no boundary nodes. E.g., if the node lattice contains dimx nodes in the x-coordinate dimension ranging from 0 to (dimx−1), then the neighbors of Node((dimx−1), y0, z0) include Node((dimx−2), y0, z0) and Node (0, y0, z0), and similarly for the y-coordinate and z-coordinate dimensions. This is represented in FIG. 2 by links 202D, 202E, 202F which wrap around from a last node in an x, y and z dimension, respectively to a first, so that node 203, although it appears to be at a "corner" of the lattice, has six node-to-node links 202A-F. It will be understood that, although this arrangement is a preferred embodiment, a logical torus without boundary nodes is not necessarily a requirement of a lattice structure.

The aggregation of node-to-node communication links 202 is referred to herein as the torus network. The torus network permits each compute node to communicate results of data processing tasks to neighboring nodes for further processing in certain applications which successively process data in different nodes. However, it will be observed that the torus network contains only a limited number of links, and data flow is optimally supported when running generally parallel to the x, y or z coordinate dimensions, and when running to successive neighboring nodes. For this reason, applications requiring the use of a large number of nodes may subdivide computation tasks into blocks of logically adjacent nodes (communicator sets) in a manner to support a logical data flow, where the nodes within any block may execute a common application code function or sequence.

Figure 3A:
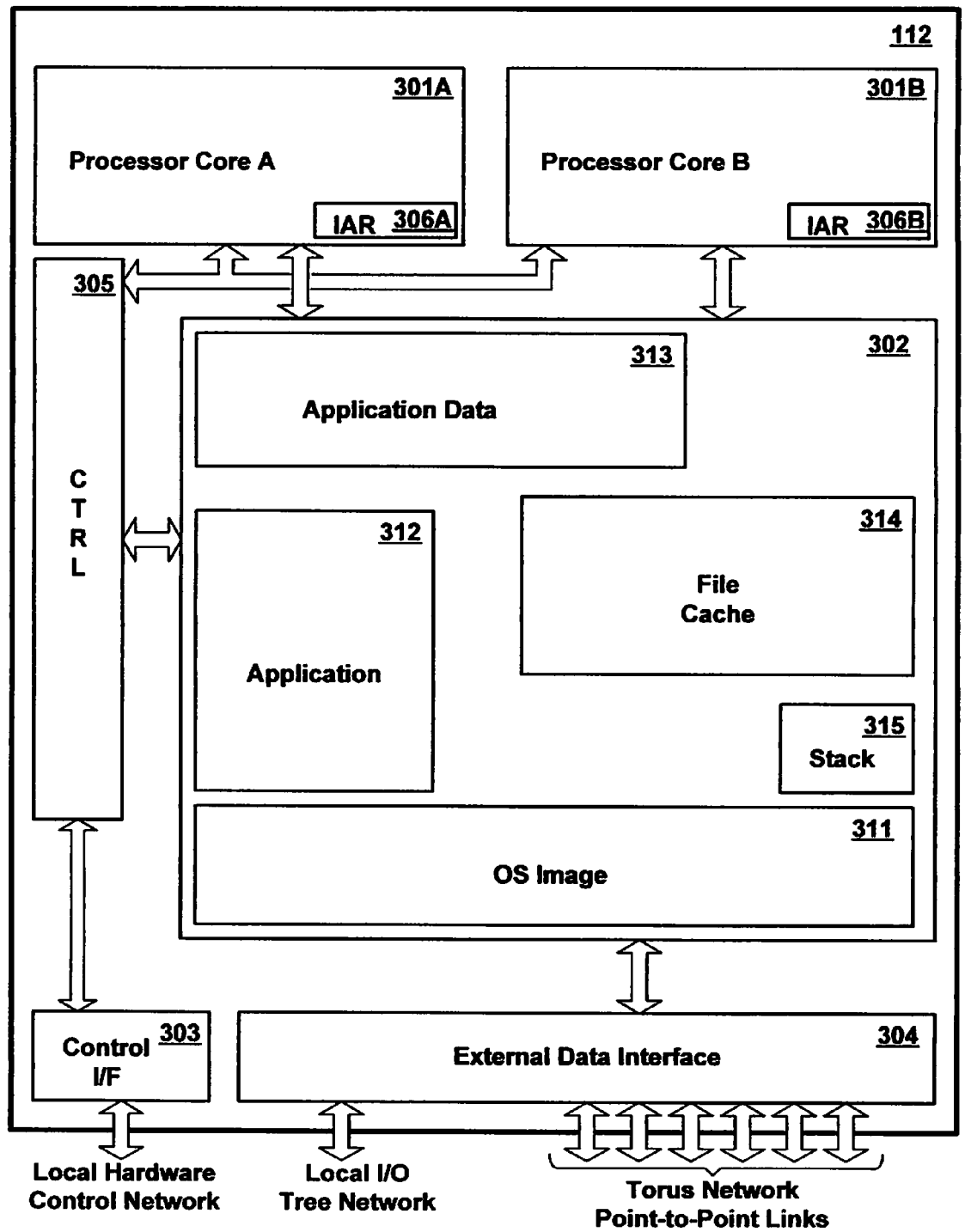
FIG. 3A is a high-level diagram of a compute node of the system of FIG. 1, configured according to a coprocessor operating mode, according to the preferred embodiment.
Figure 3B:
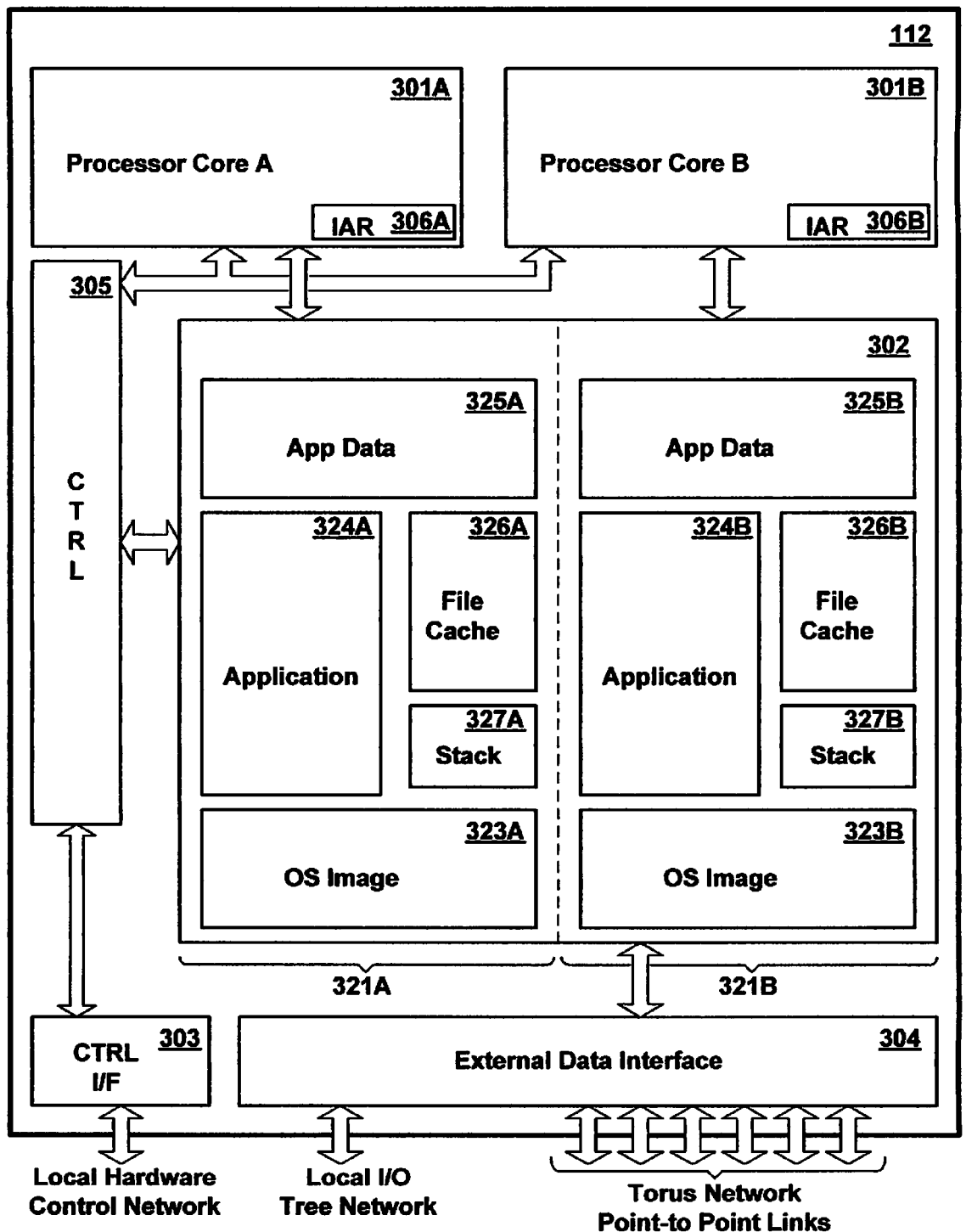
FIG. 3B is a high-level diagram of a compute node of the system of FIG. 1, configured according to a virtual node operating mode, according to the preferred embodiment.

FIGS. 3A and 3B are high-level block diagrams of the major hardware and software components of a compute node 112 of computer system 100 configured in different operating modes in accordance with the preferred embodiment, FIG. 3A representing a compute node configured according to a coprocessor operating mode, and FIG. 3B representing a compute node configured according to a virtual node operating mode. Compute node 112 comprises one or more processor cores 301A, 301B (herein generically referred to as feature 301), two processor cores being present in the preferred embodiment, it being understood that this number could vary. Compute node 112 further comprises a single addressable nodal memory 302 which is used by both processor cores 301; an external control interface 303 which is coupled to the corresponding local hardware control network 114; an external data communications interface 304 which is coupled to the corresponding local I/O tree network 113, and the corresponding six node-to-node links 202 of the torus network; and monitoring and control logic 305 which receives and responds to control commands received through external control interface 303. Monitoring and control logic 305 can access certain registers in processor cores 301 and locations in nodal memory 302 on behalf of control subsystem 102 to read or alter the state of node 112. In the preferred embodiment, each node 112 is physically implemented as a respective single, discrete integrated circuit chip.

From a hardware standpoint, each processor core 301 is an independent processing entity capable of maintaining state for and executing threads independently. Specifically, each processor core 301 contains its own instruction state register or instruction address register 306A, 306B (herein generically referred to as feature 306) which records a current instruction being executed, instruction sequencing logic, instruction decode logic, arithmetic logic unit or units, data registers, and various other components required for maintaining thread state and executing a thread.

Each compute node can operate in either coprocessor mode or virtual node mode, independently of the operating modes of the other compute nodes. When operating in coprocessor mode, the processor cores of a compute node do not execute independent threads. Processor Core A 301A acts as a primary processor for executing the user application sub-process assigned to its node, and instruction address register 306A will reflect the instruction state of that sub-process, while Processor Core B 301B acts as a secondary processor which handles certain operations (particularly communications related operations) on behalf of the primary processor. When operating in virtual node mode, each processor core executes its own user application sub-process independently and these instruction states are reflected in the two separate instruction address registers 306A, 306B, although these sub-processes may be, and usually are, separate sub-processes of a common user application. Because each node effectively functions as two virtual nodes, the two processor cores of the virtual node constitute a fourth dimension of the logical three-dimensional lattice 201. I.e., to specify a particular virtual node (a particular processor core and its associated subdivision of local memory), it is necessary to specify an x, y and z coordinate of the node (three dimensions), plus a virtual node (either A or B) within the node (the fourth dimension).

As described, functional network 105 services many I/O nodes, and each I/O node is shared by multiple compute nodes. It should be apparent that the I/O resources of massively parallel system 100 are relatively sparse in comparison with its computing resources. Although it is a general purpose computing machine, it is designed for maximum efficiency in applications which are compute intensive. If system 100 executes many applications requiring large numbers of I/O operations, the I/O resources will become a bottleneck to performance.

In order to minimize I/O operations and inter-nodal communications, the compute nodes are designed to operate with relatively little paging activity from storage. To accomplish this, each compute node contains its own complete copy of an operating system (operating system image) in nodal memory 302, and a copy of the application code being executed by the processor core. Unlike conventional multi-tasking system, only one software user application sub-process is active at any given time. As a result, there is no need for a relatively large virtual memory space (or multiple virtual memory spaces) which is translated to the much smaller physical or real memory of the system's hardware. The physical size of nodal memory limits the address space of the processor core.

As shown in FIG. 3A, when executing in coprocessor mode, the entire nodal memory 302 is available to the single software application being executed. The nodal memory contains an operating system image 311, an application code image 312, and user application data structures 313 as required. Some portion of nodal memory 302 may further be allocated as a file cache 314, i.e., a cache of data read from or to be written to an I/O file.

Operating system image 311 contains a complete copy of a simplified-function operating system. Operating system image 311 includes certain state data for maintaining process state. Operating system image 311 is preferably reduced to the minimal number of functions required to support operation of the compute node. Operating system image 311 does not need, and preferably does not contain, certain of the functions normally contained in a multi-tasking operating system for a general purpose computer system. For example, a typical multi-tasking operating system may contain functions to support multi-tasking, different I/O devices, error diagnostics and recovery, etc. Multi-tasking support is unnecessary because a compute node supports only a single task at a given time; many I/O functions are not required because they are handled by the I/O nodes 111; many error diagnostic and recovery functions are not required because that is handled by control subsystem 102 or front-end nodes 103, and so forth. In the preferred embodiment, operating system image 311 contains a simplified version of the Linux operating system, it being understood that other operating systems may be used, and further understood that it is not necessary that all nodes employ the same operating system.

Application code image 302 is preferably a copy of the application code being executed by compute node 112. Application code image may contain a complete copy of a computer program which is being executed by system 100, but where the program is very large and complex, it may be subdivided into portions which are executed by different respective compute nodes. Memory 302 further includes a call-return stack 315 for storing the states of procedures which must be returned to, which is shown separate from application code image 302, although in may be considered part of application code state data.

Referring to FIG. 3B, when executing in virtual node mode, nodal memory 302 is subdivided into a respective separate, discrete memory subdivision 321A, 321B (herein generically referred to as feature 321) for each processor core. These memory subdivisions are represented in FIG. 3B as contiguous regions of nodal memory, although it should be understood that they need not be contiguous.

In virtual node mode each subdivision 321 contains its own copy of operating system image 323A, 323B (herein generically referred to as feature 323). Like operating system image 311 used in coprocessor mode, operating system image 323 is an image of a reduced-function operating system, preferably a reduced-function Linux operating system. In the preferred embodiment all compute nodes use the same reduced function operating system, and the instruction code contained in the various operating system images 311, 323 is identical (although state data embedded in the image may, of course, vary). However, since system hardware is general and each compute node executes its instructions independently, it would conceivably be possible to employ different operating systems in different compute nodes, and even to employ different operating systems for different processor cores in the same compute node when operating in virtual node mode.

In virtual node mode, each subdivision 321 further contains its own copy of a respective application code image 324A, 324B (herein referred to generically as feature 324) as well as any application data structures 325A, 325B, file caches 326A, 326B and call-return stacks 327A, 327B (herein referred to generically as feature 327) required to support the user application sub-process being executed by the associated processor core. Since each node executes independently, and in virtual node mode, each co-processor has its own nodal memory subdivision 321 maintaining an independent state, application code images 324 within the same node may be different, not only in state data but in the executable code contained therein. Typically, in a massively parallel system, blocks of compute nodes are assigned to work on different user applications or different portions of a user application, and within a block all the compute nodes might be executing sub-processes which use a common application code instruction sequence. However, it is possible for every compute node 111 in system 100 to be executing the same instruction sequence, or for every compute node to be executing a different respective sequence. using a different respective application code image.

In either coprocessor or virtual node operating mode, the entire addressable memory of each processor core 301 is contained in the local nodal memory 302. Unlike certain computer architectures such as so-called non-uniform memory access (NUMA) systems, there is no global address space among the different compute nodes, and no capability of a processor in one node to address a location in another node. When operating in coprocessor mode, the entire nodal memory 302 is accessible by each processor core 301 in the compute node. When operating in virtual node mode, a single compute node acts as two "virtual" nodes. This means that a processor core 301 may only access memory locations in its own discrete memory subdivision 321. In the representation of FIG. 3B, processor core 301A can access only memory locations in subdivision 321A, and processor core 301B can access only memory locations in subdivision 321B.

While a system having certain types of nodes and certain inter-nodal communications structures is shown in FIGS. 1 and 2, and a typical node having two processor cores and various other structures is shown in FIGS. 3A and 3B, it should be understood that FIGS. 1, 2, 3A and 3B are intended only as a simplified example of one possible configuration of a massively parallel system for illustrative purposes, that the number and types of possible devices in such a configuration may vary, and that the system often includes additional devices not shown. In particular, the number of dimensions in a logical matrix or lattice might vary; and a system might be designed having only a single processor for each node, with a number of processors greater than two, and/or without any capability to switch between a coprocessor mode and a virtual node mode. While various system components have been described and shown at a high level, it should be understood that a typical computer system contains many other components not shown, which are not essential to an understanding of the present invention. Furthermore, various software entities are represented conceptually in FIGS. 1, 3A and 3B as blocks or blocks within blocks of local memories 122 or 302. However, it will be understood that this representation is for illustrative purposes only, and that particular modules or data entities could be separate entities, or part of a common module or package of modules, and need not occupy contiguous addresses in local memory. Furthermore, although a certain number and type of software entities are shown in the conceptual representations of FIGS. 1, 3A and 3B, it will be understood that the actual number of such entities may vary and in particular, that in a complex computer system environment, the number and complexity of such entities is typically much larger.

In accordance with the preferred embodiment of the present invention, data collection utility 124 in control subsystem 102 collects various diagnostic and performance data concerning the operation of compute core 101 by interrogating the nodes of the compute core using control system network 106. In particular, data collection utility 124 collects call-return stack traceback data for multiple processes or sub-processes executing in various nodes of the compute core, although it may collect other data as well.

Call-return stack traceback data is obtained by first interrogating each node of a pre-defined set of nodes to obtain the contents of the instruction address register for each node of the set. Usually, the pre-defined set is a set of nodes assigned to execution of a particular user application of interest, although it could be defined on some other basis. The pre-defined set may include all the nodes of the compute core, or may be some subset of the nodes. In the preferred embodiment, the instruction address register contains a single address of a current instruction; it will be understood that some systems may contain multiple registers storing concurrently executing instructions.

The nodes are then grouped into subsets according to the value of the instruction address thus obtained. I.e., nodes having identical instruction addresses are grouped together in the same subset. With respect to each such subset, an assumption is made that all the nodes of the subset have the same stack traceback data. Accordingly, a single respective node is arbitrarily chosen from each subset, and the chosen node is interrogated to obtain the full stack traceback, i.e., an ordered list of procedures which must be returned to, as recorded in the call-return stack. Because the control system network 106 interrogates memory locations in the nodal memories, each stack entry must be individually retrieved in sequence and used to find the next stack entry. Obtaining a full stack traceback for a single node therefore may involve a considerable number of data transfer operations over the control system network. Where many nodes are executing the same set of code procedures in parallel, some nodes will likely be at duplicate instruction addresses. By not requiring that full stack traceback data be retrieved from each such node, stack tracebacks may be collected significantly faster.

Stack traceback data thus collected is normally presented to a user as one step in analyzing some error or other condition. Such data may also be input to an automated analyzer, i.e. a computer program which analyzes the data (possibly along with other data) to detect possible anomalies. Preferably, a user may override the assumption that all nodes having the same instruction address have the same full stack traceback, and require that additional stack traceback data be obtained from all nodes or from some user-specified subset of nodes. This may be useful particularly where the user has narrowed the error or other condition of interest to some subset of nodes having a common instruction address value, and wishes to verify that all nodes of the subset do indeed have the same stack traceback data.

Figure 4A:
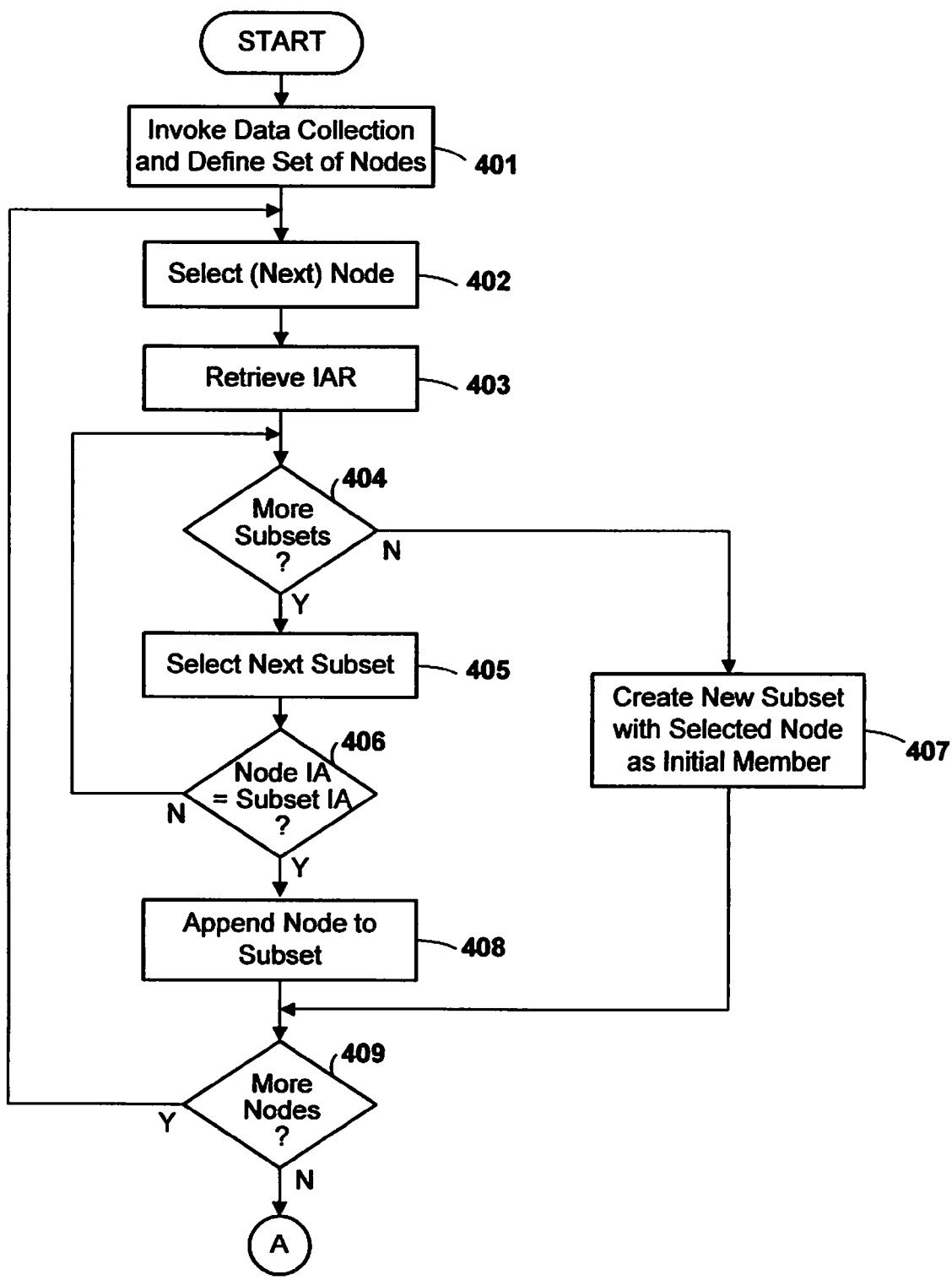
FIGS. 4A and 4B (herein collectively referred to as FIG. 4) are a high-level flow diagram showing the process of collecting stack traceback data for a set of nodes of computer system 100, according to the preferred embodiment.
Figure 4B:
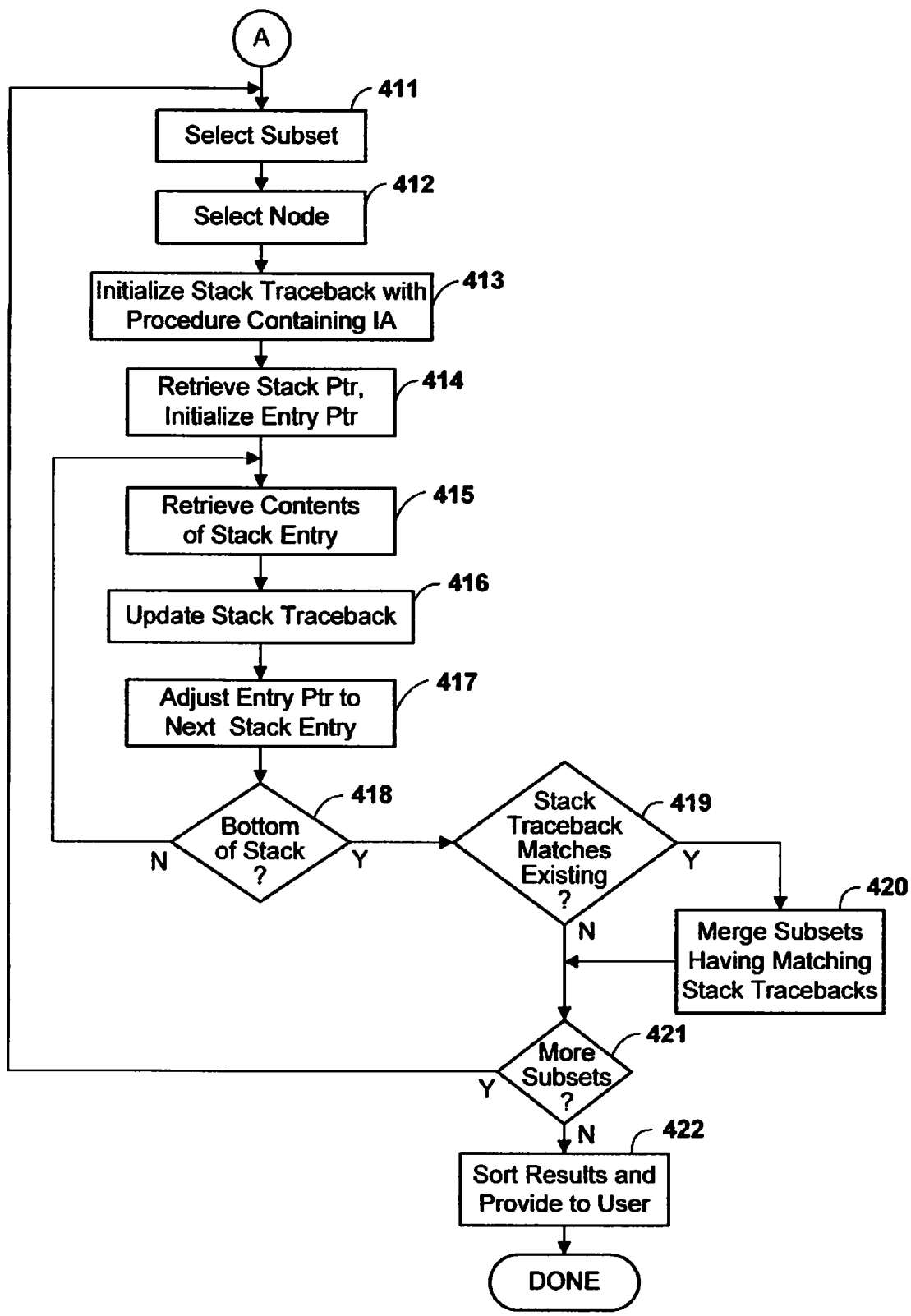

FIGS. 4A and 4B (herein collectively referred to as FIG. 4) are a high-level flow diagram showing the process of collecting stack traceback data for a set of nodes of computer system 100, according to the preferred embodiment. Referring to FIG. 4, a user (who may be a system administrator, developer, or other user) invokes the data collection utility 124 and specifies, either implicitly or explicitly, a set of nodes for which data is to be collected, herein referred to as a problem set (step 401). Typically, the user is attempting to analyze the behavior of a particular application which recently executed (and perhaps concluded abnormally) on system 100. In such a case, the problem set will typically be the set of all compute nodes which were allocated to the application in question, and this set may be specified by identifying the application (i.e., without the user having to specify node-by-node). However, one could alternatively specify all nodes in system 100, or some arbitrary subset of nodes in system 100. Where the nodes of the problem set or some portion thereof are being operated in "virtual node" mode, then each virtual node is treated as a separate node for purposes of collecting stack traceback data; in the remaining description herein, the word "node" will be understood to include a virtual node where applicable. The user may optionally specify other parameters of data collection. For example, the user may optionally specify additional data to be collected from each node of the problem set. In the preferred embodiment, the collection of selective stack traceback data as described herein is a user controlled option, and the user could alternatively specify that full traceback data be collected from all nodes of the problem set in the conventional manner. In the remaining steps of FIG. 4 and the accompanying description, it is assumed that the user does not require full traceback data collection from all nodes of the problem set.

Data collector 124 selects a (next) node (which could be a virtual node, if applicable) for polling (step 402), and retrieves the contents of the node's instruction address register 306 (step 403). In the case of a node being operated in co-processor mode, this is the contents of the instruction address register 306A for Processor A; in the case of a virtual node, it is the contents of the instruction address register for the selected virtual node. The IAR contents are retrieved by communicating with control logic 305 in the applicable compute node using control system network 106, hardware controller 108, local hardware control network 114 and control interface 303. Control logic 305 interrogates the appropriate instruction address register 306 directly, without dependence on the local operating systems 311, 323 or the functional network 105.

Data collector 124 then attempts to match the retrieved instruction address data with an instruction address corresponding to a subset of nodes, each node of the subset having the same instruction address (represented as steps 404-406). If any subsets remain to be compared, the 'Y' branch is taken from step 404. A next subset of nodes is then selected at step 405. If the instruction address associated with the selected subset of nodes (i.e., the common instruction address which all the nodes of the subset share) matches the instruction address retrieved from the selected node, then the 'Y' branch is taken from step 406, and the selected node is appended to (becomes a member of) the selected subset of nodes (step 408); the data collector proceeds to step 409. If the two instruction addresses do not match, the 'N' branch is taken from step 406 to step 404. The data collector thus continues to attempt to match the instruction address of the selected node with the instruction address corresponding to one of the subsets until either a match is found (the 'Y' branch from step 406) or all subsets have been compared, causing the 'N' branch to be taken from step 404. In the latter case, a new subset is created having the selected node as its only member and the instruction address of the selected node as the instruction address associated with the subset (step 407), and the data collector proceeds to step 409.

If any more nodes remain in the problem set, the 'Y' branch is taken from step 409 and a next node is selected at step 402. When all nodes of the problem set have been thus polled to obtain the contents of their instruction address registers, the 'N' branch is taken from step 409.

Data collector 124 obtains the full stack traceback for a representative node of each subset, shown generally as steps 411-421. Data collector 124 selects a next subset of the subsets constructed as described above (step 411). A single node within the subset is selected (step 412). Any arbitrary node within the subset can be selected, although the algorithmic implementation will usually select a particular one, e.g., the first node of the a list of nodes in the subset. The data collector initializes a stack traceback data structure in internal memory 122 (step 413). The stack traceback data structure will record the essential details of the stack traceback. The initial entry in the stack traceback data structure will record the procedure in which the node was executing when execution was halted and stack traceback data was collected, i.e., the procedure containing the instruction indicated in the instruction address register, which was previously obtained at step 403. The most recently executing procedure is thus obtained from the IAR 306 rather than the stack 315, 327, since the stack only records procedures which must be returned to after some other procedure or procedures complete.

To obtain the data from the stack of the selected node, data collector 124 retrieves a stack pointer at a known fixed location in memory (e.g. within OS image 311 or 323) (step 414). The stack pointer points to the entry at the top of the stack, i.e., the most recently appended entry to the stack. The stack pointer initializes a stack entry pointer for accessing various stack entries.

Using the stack entry pointer, the data collector then retrieves at least some contents of the stack entry pointed to by the stack entry pointer (step 415). Due to the limited data capacity of the control system network, the data collector typically will not retrieve the entire contents of the stack entry. It will retrieve selective data from the entry header, in particular: (a) a procedure identifier, and (b) a pointer, length field, or similar data from which it is possible to derive the location in memory 112 of the next stack entry. The data collector may optionally retrieve other data from the stack entry, but preferably does not retrieve all the contents of the entry, e.g., does not retrieve values of local variables, etc. These retrieved items are preferably located at fixed offsets from the beginning of the stack entry previously obtained.

The stack traceback data structure is then updated by appending the procedure obtained from the stack entry (step 416). Selective other data from the stack entry could be included with a procedure identifier. The stack entry pointer is then adjusted to point to the next stack entry (step 417).

If the adjusted stack entry pointer points to a valid stack entry, the 'N' branch is taken from step 418, and selective contents of the next entry are retrieved at step 415. If the bottom of the stack has been reached (there are no more entries in the stack), the 'Y' branch is taken from step 418.

At this point, a complete stack traceback has been constructed for the selected node, which is assumed to be the same for all nodes of the selected subset. This stack traceback is then compared to the stack tracebacks of any other subsets for which stack tracebacks have already been constructed, to determine whether any stack tracebacks match (step 419). Two stack tracebacks "match" if their complete sequences of procedure identifiers are identical. It will be observed that each subset contains those nodes having the same IAR value. Since a procedure usually contains multiple instructions, it is possible that multiple subgroups will have the same stack traceback, i.e., represent nodes at different instructions within the same procedure, but otherwise having the same stack history. In general, the difference in IAR value is not deemed significant. Therefore, if the stack traceback of the selected node and subset matches a previously constructed stack traceback (the 'Y' branch from step 419), then the selected subset is merged with the subset which matches its stack traceback, and a single stack traceback data structure represents the merged subset (step 420).

If any more subsets remain to be selected, the 'Y' branch is taken from step 421 and a next subset is selected at step 411. When all subsets have been selected and a corresponding stack traceback obtained, the 'N' branch is taken from step 421.

The data collector then sorts the subsets (including any merged subsets) in a logical order and presents the sorted data to the user, or otherwise provides the data for use by the user, e.g. as input to some further stage of automated analysis (step 422). Subsets may be sorted according to the number of nodes in each subset, or according to any other criterion. The sorting criterion may be user-selectable. Subset data may be provided by presenting on a display or other means such as a printer, by transmission across a network for input to some other digital device, by output to a file or data structure, etc.

A particular method or algorithm for analyzing and presenting data to the user is described herein as a preferred embodiment along with certain variants. It will be understood that various alternative algorithms could be used within the scope of the present invention, of which the following are a few examples, it being understood that these alternatives are described as illustrative examples, and not by way of limitation on the scope of alternatives possible.

As described above, subsets of nodes are first constructed by retrieving the IAR of each node, and a representative node of each subset is then selected and full traceback data obtained. However, some of these steps could be performed in a different order. For example, depending on the design of the control system network, it may be possible to broadcast a request for certain data to multiple nodes simultaneously. Other variations are possible in the ordering of operations.

In the preferred embodiment, a single node is selected from each subset based on the IAR, and full traceback data obtained from that node only. However, there are multiple variations in the scope of data obtained. One could, e.g., obtain further although partial traceback data from all the nodes or a representative sample of multiple nodes.

In the preferred embodiment, a control subsystem, which is a small computer system within a larger massively parallel system, retrieves data from the nodes as described using a control system network. However, the retrieval of stack traceback data could be performed using alternative communications paths to the nodes, and could be performed using other hardware mechanisms. For example, one or more of the compute nodes or front-end nodes themselves could perform the task of retrieving traceback data, and such a task could be performed in a distributed fashion by multiple entities.

In general, the routines executed to implement the illustrated embodiments of the invention, whether implemented as part of an operating system or a specific application, program, object, module or sequence of instructions, are referred to herein as "programs" or "computer programs". The programs typically comprise instructions which, when read and executed by one or more processors in the devices or systems in a computer system consistent with the invention, cause those devices or systems to perform the steps necessary to execute steps or generate elements embodying the various aspects of the present invention. Moreover, while the invention has and hereinafter will be described in the context of fully functioning computer systems, the various embodiments of the invention are capable of being distributed as a program product in a variety of forms, and the invention applies equally regardless of the particular type of computer-readable signal-bearing media used to actually carry out the distribution. Examples of signal-bearing media include, but are not limited to, volatile and non-volatile memory devices, floppy disks, hard-disk drives, CD-ROM's, DVD's, magnetic tape, and so forth. Examples of signal-bearing media are illustrated in FIG. 1 as memory 122 and storage devices 109A, 109B, 125, and in FIGS. 3A and 3B as memory 302.

Although a specific embodiment of the invention has been disclosed along with certain alternatives, it will be recognized by those skilled in the art that additional variations in form and detail may be made within the scope of the following claims.

What is claimed is:

1. A computer-implemented method for generating call-return stack tracebacks from multiple nodes of a parallel computer system having a plurality of nodes, each node comprising at least one processor for executing a respective application sub-process and a nodal memory, said method comprising the steps of:

with respect to each subset of a plurality of subsets of a pre-defined set of nodes, retrieving respective call-return stack traceback data from each of at least one node of the subset, wherein, for at least some said subsets, respective initial call-return stack traceback data is retrieved from each node of a respective first plurality of nodes of the subset, and respective additional call-return traceback data is retrieved from each node of fewer than all of the respective first plurality of nodes of the subset;

constructing a plurality of call-return stack tracebacks using data retrieved by said step of retrieving respective call-return stack traceback data, each node of said pre-defined set corresponding to a respective said call-return stack traceback, wherein for at least some nodes, a corresponding call-return stack traceback is constructed using said call-return stack traceback data retrieved from a node other than the corresponding node and in the same subset as the corresponding node; and providing results of said constructing step to a user.

2. The method for generating call-return stack tracebacks of claim 1, further comprising the step of:

automatically assigning each node of said pre-defined set of nodes to a respective subset of a plurality of discrete subsets of said pre-defined set of nodes.

3. The method for generating call-return stack tracebacks of claim 2, wherein said step of automatically assigning each node of said pre-defined set of nodes to a respective subset comprises the steps of:

retrieving respective partial call-return stack traceback data generated during execution of a respective application sub-process from each node of said pre-defined set of nodes of said plurality of nodes; and assigning each node of said pre-defined set of nodes to a respective subset of a plurality of discrete subsets of said pre-defined set of nodes according to the partial call-return stack traceback data retrieved by said step of retrieving respective partial call-return stack traceback data.

4. The method for generating call-return stack tracebacks of claim 3, wherein said partial call-return stack traceback data is an instruction state obtained from at least one instruction state register in the respective node.

5. The method for generating call-return stack tracebacks of claim 1, wherein said step of retrieving call-return stack traceback data comprises retrieving said respective additional call-return stack traceback data from one and only one node of each respective subset.

6. The method for generating call-return stack traceback data of claim 1, wherein said parallel computer system comprises a control subsystem separate from said plurality of nodes, said control subsystem comprising a memory and at least one processor executing instructions from said memory; and wherein said steps of retrieving respective call-return stack traceback data from each of at least one node of the subset, and constructing a plurality of call-return stack tracebacks, are performed by a computer program executing on said at least one processor of said control subsystem.

7. The method for generating call-return stack traceback data of claim 6, wherein said parallel computer system further comprises a control system network supporting communication between said control subsystem and said plurality of nodes, said control system network being coupled to control logic in each respective node for interrogating memory locations under control of said control subsystem; and wherein said step of retrieving respective call-return stack traceback data from each of at least one node of the subset is performed using said control system network.

8. The method for generating call-return stack traceback data of claim 1, wherein said step of retrieving respective call-return stack traceback data from each of at least one node of the subset comprises successively traversing each stack entry in a respective call-return stack in at least one node of the subset until the bottom of the stack is reached.

9. A program product for generating call-return stack tracebacks from multiple nodes of a parallel computer system having a plurality of nodes, each node comprising at least one processor for executing a respective application sub-process and a nodal memory, the program product comprising:

a plurality of computer executable instructions recorded on tangible computer-readable media, wherein said instructions, when executed by at least one computer system, cause the at least one computer system to perform the steps of:

with respect to each subset of a plurality of subsets of a pre-defined set of nodes, retrieving respective call-return stack traceback data from each of at least one node of the subset, wherein, for at least some said subsets, respective initial call-return stack traceback data is retrieved from each node of a respective first plurality of nodes of the subset, and respective additional call-return traceback data is retrieved from each node of fewer than all of the respective first plurality of nodes of the subset, wherein said computer executable instructions automatically assign each node of said pre-defined set of nodes to a respective subset of a plurality of discrete subsets of said pre-defined set of nodes;

constructing a plurality of call-return stack tracebacks using data retrieved by said step of retrieving call-return stack traceback data, each node of said pre-defined set corresponding to a respective said call-return stack traceback, wherein for at least some nodes, a corresponding call-return stack traceback is constructed using said additional call-return stack traceback data retrieved from a node other than the corresponding node and in the same subset as the corresponding node; and providing results of said constructing step to a user.

10. The program product of claim 9, wherein said instructions, when executed by at least one computer system, further cause the at least one computer system to perform the step of:

automatically assigning each node of said pre-defined set of nodes to a respective subset of a plurality of discrete subsets of said pre-defined set of nodes by (i) retrieving respective partial call-return stack traceback data generated during execution of a respective application sub-process from each node of said pre-defined set of nodes of said plurality of nodes, and (ii) assigning each node of said pre-defined set of nodes to a respective subset of a plurality of discrete subsets of said pre-defined set of nodes according to the partial call-return stack traceback data retrieved by said step of retrieving respective partial call-return stack traceback data.

11. The program product of claim 10, wherein said partial call-return stack traceback data is an instruction state obtained from at least one instruction state register in the respective node.

12. The program product of claim 9, wherein said step of retrieving call-return stack traceback data comprises retrieving said call-return stack traceback data from one and only one node of each respective subset.

13. The program product of claim 9, wherein said parallel computer system comprises a control subsystem separate from said plurality of nodes, said control subsystem comprising a memory and at least one processor executing instructions from said memory, said program product being executable on said control subsystem.

14. The program product of claim 13, wherein said parallel computer system further comprises a control system network supporting communication between said control subsystem and said plurality of nodes, said control system network being coupled to control logic in each respective node for interrogating memory locations under control of said control subsystem; and wherein said step of retrieving additional call-return stack traceback data from at least one node of the subset is performed using said control system network.

15. The program product of claim 9, wherein said step of retrieving call-return stack traceback data from at least one node of the subset comprises successively traversing each stack entry in a respective call-return stack in the at least one node of the subset until the bottom of the stack is reached.

16. A computer system which analyzes errors in a parallel computing lattice, said lattice comprising a plurality of nodes coupled by inter-nodal communications paths, each node comprising at least one processor for executing a respective application sub-process and a nodal memory, the computer system comprising:

at least one processor;

a memory for storing data addressable by said at least one processor;

a data collector program embodied as computer executable instructions storable in said memory and executable on said at least one processor, said data collector program comprising:

(a) a node data retrieval function which retrieves, with respect to each subset of a plurality of subsets of a pre-defined set of nodes, call-return stack traceback data from at least one node of the subset, wherein, for at least some said subsets, additional call-return stack traceback data is retrieved from fewer than all the nodes of the subset;

wherein said data collector program automatically assigns each node of said pre-defined set of nodes to a respective subset of a plurality of discrete subsets of said pre-defined set of nodes by: (i) retrieving respective partial call-return stack traceback data generated during execution of a respective application sub-process from each node of said pre-defined set of nodes of said plurality of nodes, and (ii) assigning each node of said pre-defined set of nodes to a respective subset of a plurality of discrete subsets of said pre-defined set of nodes according to the partial call-return stack traceback data retrieved by said step of retrieving respective partial call-return stack traceback data; and (b) a collating function which constructs a plurality of call-return stack tracebacks using data retrieved by said node data retrieval function, each node of said pre-defined set corresponding to a respective said call-return stack traceback, wherein for at least some nodes, a corresponding call-return stack traceback is constructed using said call-return stack traceback data retrieved from a node other than the corresponding node and in the same subset as the corresponding node.

17. The computer system of claim 16, wherein said computer system is a massively parallel computer system which includes said parallel computing lattice.

18. The computer system of claim 17, wherein said computer system comprises a control subsystem separate from said parallel computing lattice, said control subsystem including at least one processor, a memory for storing data addressable by said at least one processor, and said data collector program.

19. The computer system of claim 16, wherein said partial call-return stack traceback data is an instruction state obtained from at least one instruction state register in the respective node.

* * * * *